(No Model.)

C. P. LINDLEY.
JULEP STRAINER.

No. 404,204. Patented May 28, 1889.

Witnesses.
C. M. Newman,
Etta F. Pettit

Inventor.
Charles P. Lindley
By A. M. Wooster
Atty.

UNITED STATES PATENT OFFICE.

CHARLES P. LINDLEY, OF BRIDGEPORT, CONNECTICUT.

JULEP-STRAINER.

SPECIFICATION forming part of Letters Patent No. 404,204, dated May 28, 1889.

Application filed December 26, 1888. Serial No. 294,615. (No model.)

*To all whom it may concern:*

Be it known that I, CHARLES P. LINDLEY, a citizen of the United States, residing at Bridgeport, in the county of Fairfield and State of Connecticut, have invented certain new and useful Improvements in Julep-Strainers; and I do hereby declare the following to be a full, clear, and exact description of the invention, such as will enable others skilled in the art to which it appertains to make and use the same.

My invention has for its object the production of a strainer which shall be especially adapted for use in the concocting of mixed drinks—for example, juleps, cocktails, &c.— in which it is desirable to retain the particles of ice, sprigs of mint, pieces of fruit, &c., in the mixing-glass, so that the liquid poured into the drinking-glass shall be perfectly clear, small particles of ice being the most difficult to retain in the mixing-glass, and the most objectionable by far to fastidious drinkers. Various strainers for this purpose have heretofore been devised, but none, so far as I am aware, have been adapted to adjust themselves to various styles and shapes of glasses, and to fit closely around the entire inner edge of any ordinary-sized glass, no matter at what angle the strainer may be placed.

In order to be able to furnish a strainer which shall be self-adjusting to all styles and sizes of glasses, and especially that will fit the glass at its outer edge; which will not obstruct the passage of liquid, but will effectually shut back particles of ice, &c., and which at the same time shall be simple, inexpensive, practically impossible to get out of repair, and attractive in appearance, I have devised the novel strainer, of which the following description, in connection with the accompanying drawings, is a specification, numbers being used to denote the several parts.

Figure 1:
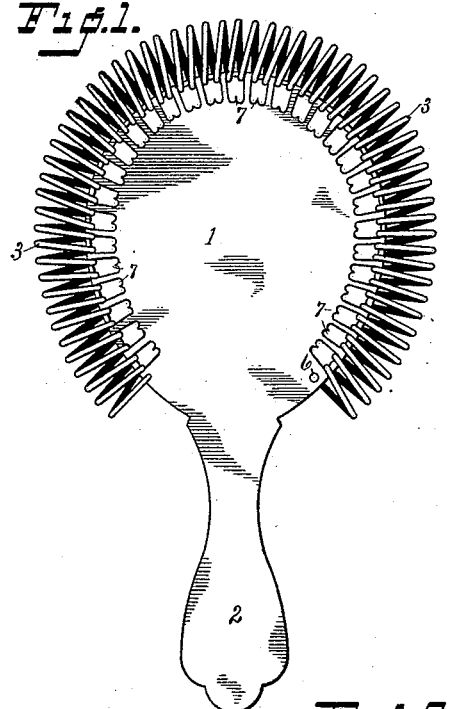
Figure 2:
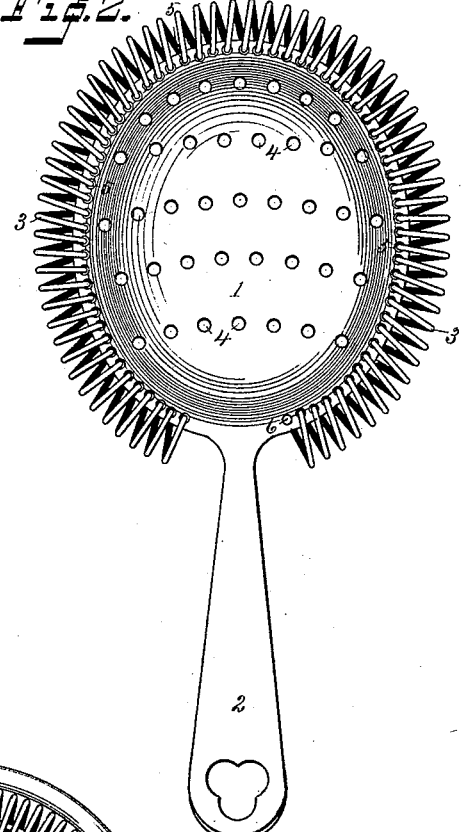
Figure 3:
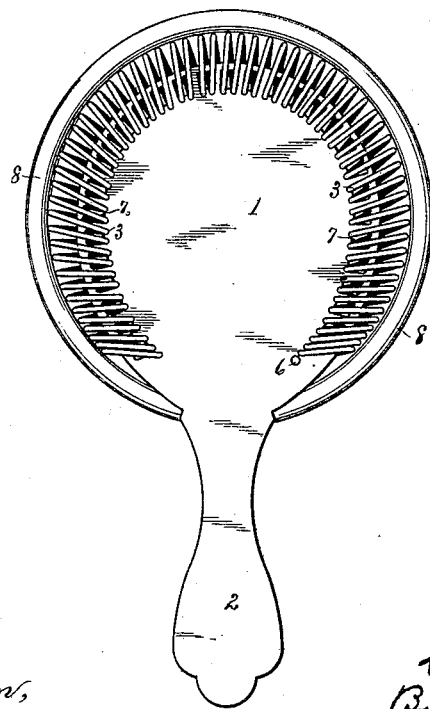

Figures 1 and 2 are elevations illustrating different ways in which I have carried my invention into effect; and Fig. 3 is a plan view of a mixing-glass with my novel strainer placed therein, and illustrating the manner of its use.

The strainer consists of an approximately round metallic plate, designated by 1, which is preferably provided with a handle, 2, and has around its outer edge a coil of wire, designated by 3. The exact shape of the plate is not of the essence of my invention, and the style of the handle may of course be varied to suit the taste of the manufacturer or the requirements of the trade. In Figs. 1 and 3 I have shown the plate as flat, and in Fig. 2 I have shown it as concavo-convex. The plate may or may not be provided with perforations 4. The exact length of the coil likewise is not of the essence of my invention. It may be carried clear around to the handle on both sides, or may extend only about three-quarters around, if preferred. I preferably make the strainers about as shown in the drawings. The wire of the coil may either be threaded through holes 5, at the edge of the plate, and the ends headed down, as at 6, (see Fig. 2,) or contiguous coils may be passed through openings 7 near the outer edge of the plate, said openings extending inward some distance, as shown in Fig. 1, the ends of the coil being fastened as before. Where openings 7 are used, it will be apparent that when the strainer is pressed into a glass the coils will yield inward, being forced back into said openings. When the coils are threaded through holes, as in Fig. 2, the coil will be rolled backward over the plate when the strainer is pressed into a glass. I have found both forms to be perfectly practical in use.

The operation of my novel strainer in use can hardly require further explanation. It is simply pressed down into the glass, which I have designated by 8, in Fig. 3. As the outer edge of the strainer is pressed downward, the coils of wire will lie close up against the glass, and the coils at the side will be either pressed inward into openings 7, or, in the form illustrated in Fig. 2, will be rolled upward partially over the plate. In both forms the liquid is permitted to pass through freely; but particles of ice, fruit, mint, &c., are retained under the strainer when the mixing-glass is tilted to pour the liquid out into a drinking-glass.

I do not of course desire to limit myself to the exact details of construction shown in the drawings, as it is obvious that they may be varied within reasonable limits without departing from the spirit of my invention.

I claim—

1. A strainer consisting of a plate having a coil of wire secured around its outer edge.

2. A strainer consisting of a plate having openings near its outer edge, and a coil of wire surrounding said edge, the coils thereof being passed through said openings, as and for the purpose set forth.

3. A strainer consisting of a plate having a handle, and a coil of wire partially surrounding the outer edge thereof, said coil being loosely connected to the plate, so as to yield when the latter is pressed into a glass.

In testimony whereof I affix my signature in presence of two witnesses.

CHARLES P. LINDLEY.

Witnesses:
  A. M. WOOSTER,
  BERTHA E. LEE.